United States Patent
Winterberg et al.

(10) Patent No.: US 12,468,649 B2
(45) Date of Patent: Nov. 11, 2025

(54) ON-DIE TERMINATION OPTIMIZATION

(71) Applicant: DELL PRODUCTS L.P., Round Rock, TX (US)

(72) Inventors: Douglas S. Winterberg, York, SC (US); V Mallikarjun Goud, Secunderabad (IN); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 18/468,068

(22) Filed: Sep. 15, 2023

(65) Prior Publication Data

US 2025/0045234 A1   Feb. 6, 2025

(30) Foreign Application Priority Data

Aug. 3, 2023 (IN) .............................. 202311052170

(51) Int. Cl.
*G06F 13/40* (2006.01)
*G11C 7/10* (2006.01)

(52) U.S. Cl.
CPC ........ *G06F 13/4086* (2013.01); *G11C 7/1084* (2013.01); *G11C 2207/22* (2013.01)

(58) Field of Classification Search
CPC .............. G06F 13/4086; G11C 7/1084; G11C 2207/22
See application file for complete search history.

(56) References Cited

U.S. PATENT DOCUMENTS

| | | | |
|---|---|---|---|
| 6,757,327 B1 * | 6/2004 | Fiedler | H03K 5/249 375/348 |
| 7,664,999 B2 | 2/2010 | Stave | |
| 7,786,752 B2 | 8/2010 | Oh et al. | |
| 10,657,009 B2 * | 5/2020 | Mutnury | G06F 11/1048 |
| 10,698,855 B1 * | 6/2020 | Chandra | G06F 13/4086 |
| 11,757,685 B1 * | 9/2023 | Farkas | H04L 27/14 375/229 |
| 2004/0123207 A1 * | 6/2004 | Zumkehr | G11C 7/1066 714/744 |
| 2009/0019204 A1 * | 1/2009 | Cases | G06F 13/4243 710/308 |

(Continued)

FOREIGN PATENT DOCUMENTS

| CN | 113316319 A * | 8/2021 | ............... H05K 3/32 |
|---|---|---|---|
| JP | 2024148551 A * | 10/2024 | |

*Primary Examiner* — Seokjin Kim
(74) *Attorney, Agent, or Firm* — Larson Newman, LLP (57) ABSTRACT

A receiver includes an ODT network and a signal eye sampler. The ODT network terminates a data communication interface at a selectable impedance including a nominal impedance, at least one higher impedance, and at least one lower impedance. The signal eye sampler determines an eye margin for data received on the data communication interface. The receiver selects the nominal impedance, determines a nominal eye margin associated with the nominal impedance, selects a delta impedance from one of the higher impedance and the lower impedance, determines a delta eye margin associated with the delta impedance, determines whether the delta eye margin is greater than the nominal eye margin, and sets a run time impedance value for the data communication interface to the delta impedance when the delta eye margin is greater than the nominal eye margin.

20 Claims, 3 Drawing Sheets

(56) References Cited

U.S. PATENT DOCUMENTS

| | | | |
|---|---|---|---|
| 2019/0227885 A1* | 7/2019 | Mutnury | G11C 29/42 |
| 2020/0159683 A1* | 5/2020 | Durai | G11C 7/1066 |
| 2022/0276788 A1* | 9/2022 | Li | G06F 3/0679 |
| 2024/0303144 A1* | 9/2024 | Ock | G06F 11/076 |

* cited by examiner

ON-DIE TERMINATION OPTIMIZATION

FIELD OF THE DISCLOSURE

This disclosure generally relates to information handling systems, and more particularly relates to on-die termination optimization.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A receiver may include an ODT network and a signal eye sampler. The ODT network may terminate a data communication interface at a selectable impedance including a nominal impedance, at least one higher impedance, and at least one lower impedance. The signal eye sampler may determine an eye margin for data received on the data communication interface. The receiver may select the nominal impedance, determine a nominal eye margin associated with the nominal impedance, select a delta impedance from one of the higher impedance and the lower impedance, determine a delta eye margin associated with the delta impedance, determine whether the delta eye margin is greater than the nominal eye margin, and set a run time impedance value for the data communication interface to the delta impedance when the delta eye margin is greater than the nominal eye margin.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
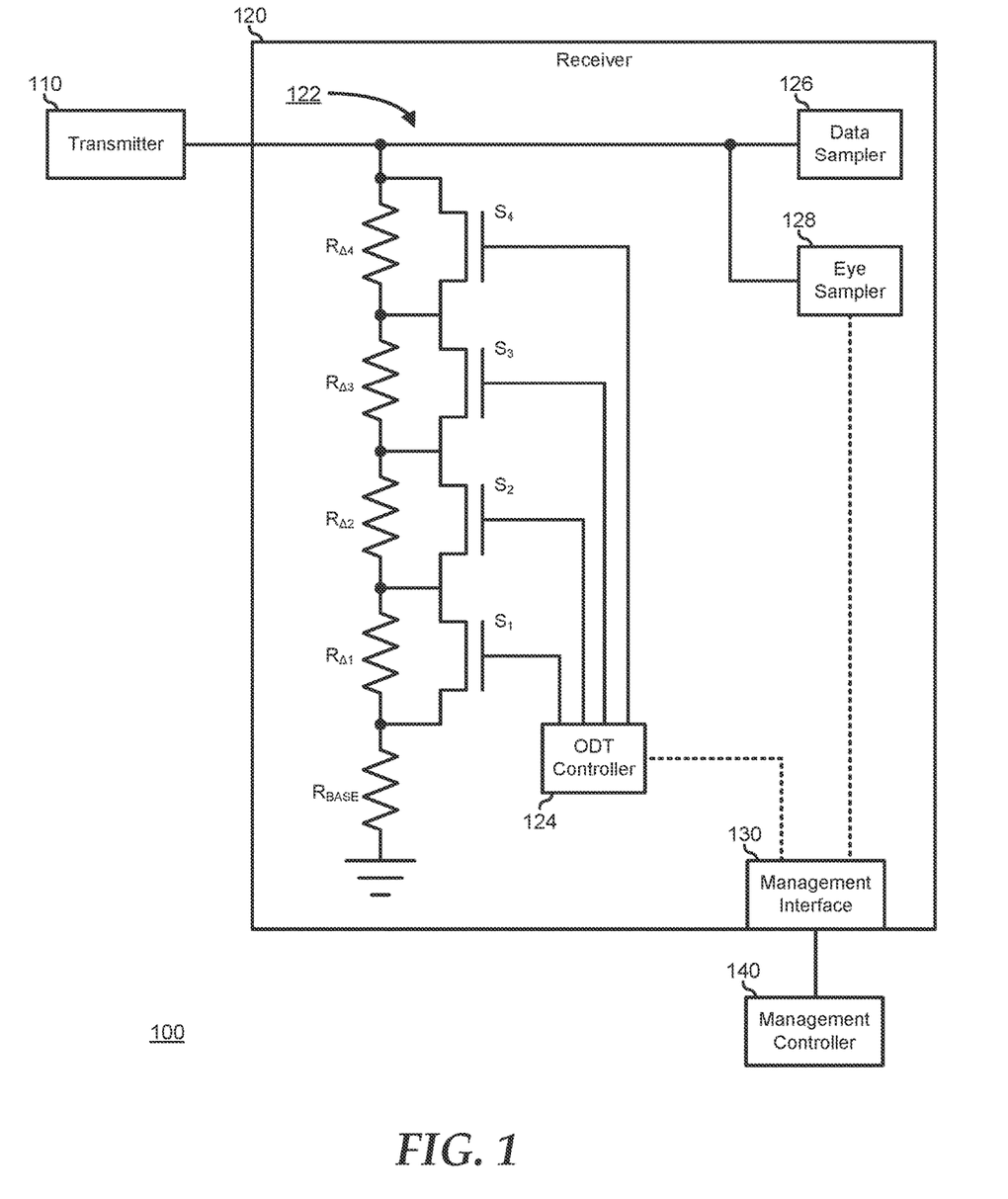
FIG. 1 is a schematic diagram of an information handling system according to an embodiment of the current disclosure.

FIG. 1 illustrates an information handling system 100 including a transmitter 110 for a high-speed data communication interface, a receiver 120 for the high-speed data communication interface, and a management controller 140. As illustrated the high-speed data communication interface carries data from transmitter 110 to receiver 120 over a single connection, such as over a stripline trace or microstrip trace instantiated in a printed circuit board (PCB) of information handling system 100. However this is not necessarily so, and the high-speed data communication interface may be representative of an interface that utilizes a differential signal topology, such as in a high-speed serial data communication interface, of a bidirectional interface where the single connection carries data both from transmitter 110 to receiver 120 and from the receiver to the transmitter, such as in a high-speed bus data communication interface. An example of a high-speed data communication interface may thus include a single direction of a bidirectional lane of a PCIe link, a single data bit of a bidirectional memory bus, such as a dual data rate (DDR) bus, or another type of data communication interface, as needed or desired.

Receiver 120 includes an on-die termination (ODT) network 122, an ODT controller 124, a data sampler 126, an eye sampler 128, and a management interface 130. ODT network 122 provides termination resistors for impedance matching inside receiver 120 instead of on the PCB. As illustrated, ODT network 122 provides a number of series connected resistors that are connected between the input of the high-speed data communication interface and a ground plane provided to receiver 120, where a selectable number of the resistors may be bypassed by selectably activating transistor components in order to tune the resistance of the ODT network. In particular, ODT network 122 includes a nominal termination resistor with a nominal value ($R_{BASE}$) that is lower than a nominal termination resistance value ($R_{NOM}$), in series with four (4) tuning resistors each with a particular tuning resistance value ($R_{A1}$-$R_{A4}$). Each of the tuning resistors ($R_{A1}$-$R_{A4}$) can be bypassed by an associated transistor ($S_1$-$S_4$). For example, where the nominal termination resistance value ($R_{NOM}$) is 240 ohm ($\Omega$), the nominal termination resistor can have a value ($R_{NOM}$) of 230$\Omega$, and the tuning resistors can each have a value of 5$\Omega$. In this case, the actual termination resistance value is settable to a selectable value of 250 $\Omega$, 255 $\Omega$, 240 $\Omega$, 235$\Omega$, and 230$\Omega$ by selectively bypassing zero (0), one (1), two (2), three (3), or four (4) of the transistors ($S_1$-$S_4$). The transistors ($S_1$-$S_4$) are controlled by ODT controller 124 based upon information received from management interface 130

Typically, the resistance value of ODT network 122 is set to a nominal termination resistance value ($R_{NOM}$) that is defined by a look-up table that accounts for the topology of information handling system 100 and of receiver 120. For example, during a power-on initialization phase of operation of information handling system 100, a system BIOS/UEFI may determine whether one (1) or two (2) dual in-line memory modules (DIMMs) are populated in a DDR memory channel of information handling system 100, and may utilize that information to look up a nominal termination resistance value ($R_{NOM}$) associated with the determined topology. The BIOS/UEFI then directs management controller 140 to communicate the nominal termination resistance value ($R_{NOM}$) to management interface 130 to direct ODT controller to select the appropriate transistors ($S_1$-$S_4$) to set the termination resistance value of ODT network 122 to the nominal termination resistance value ($R_{NOM}$).

Receiver 120 may include one or more additional ODT network similar to ODT network 122 in order to implement other nominal termination resistance values, as needed or desired. Further, while ODT network 122 is illustrated as including four tuning resistors, a greater number of tuning resistors or a smaller number of tuning resistors may be employed in an ODT network, as needed or desired. Moreover, ODT network 122 is illustrated as a network of series connected resistors ($R_{BASE}$) that is lower than a nominal termination resistance value ($R_{NOM}$ and $R_{A1}$-$R_{A4}$). However, other topologies may be utilized in an ODT network as needed or desired. For example, an ODT network may be provided based upon selectably switching resistors that are coupled together in a parallel network, or based upon a combination of serially connected resistors and parallel resistors, as needed or desired.

Data sampler 126 operates during a run time operation of information handling system 100 to receive the data signal from transmitter 110 and to recover the data presented on the data signal. Eye sampler 128 may be understood to include various compensation modules, equalization modules, clock recovery modules, or the like that operate to clean up the received data signal and meaningfully read the data presented on the data signal. The various compensation, equalization, and recovery modules include tuning settings that adjust the operations of the modules to provide a "clean" data eye that minimizes the bit error rate (BER) in reading the received data.

During the power-on initialization phase of operation of information handling system 100, various training operations are performed to adjust the tuning settings to obtain the clean data eye. In a particular embodiment, eye sampler 128 is configured with similar compensation, equalization, and recovery modules, and circuitry to determine the characteristics of the resulting data eye. Training data is transmitted from transmitter 110, and the tuning settings of eye sampler 128 are systematically changed to vary the characteristics of the data eye. Eye sampler 128 determines a set of tuning settings that provides a suitable data eye, and applies the set of tuning settings to the various compensation, equalization, and recovery modules of data sampler 126 to ensure that a desired BER is achieved on the high-speed data communication interface during the run time operation. The details of training high-speed data communication interfaces vary based upon the type of interface, and such details are known in the art and will not be further described herein, except as may be needed to illustrate the current embodiments.

It has been understood by the inventors of the current disclosure that, as the speed of high-speed data communication interfaces increases, the data eye margins shrink and traditional methods of compensating for poor data eye margins (such as interface training to determine tuning settings for the various compensation, equalization, and recovery modules) are becoming increasingly difficult. For example, fifth generation DDR (DDR5) is targeted to achieve data rates of 6.4 to 8+ Gigabits per second (Gbps), and the interface margins are becoming increasingly sensitive to variation of the DIMM ODT resistance values. However, as currently configured (that is, based upon a BIOS/UEFI look up), variations within a same configuration, DIMM raw card variations, DRAM package and I/O variations, CPU package and I/O variations, or the like), may contribute to unacceptable data eye margins.

In a particular embodiment, after the resistance value of ODT network 122 is set to a nominal termination resistance value ($R_{NOM}$) that is defined by the look-up table, receiver 120 operates to optimize the resistance value of the ODT network based upon a training sequence to fine-tune the resistance value. In particular, during the power-on initialization phase of operation, receiver 120 receives test data from transmitter 110, and eye sampler 128 determines the signal eye margin based upon the nominal termination resistance value ($R_{NOM}$). In a next step, ODT controller 128 is directed to set the resistance value of ODT network 122 to a single step higher of a resistance value, by switching in one additional tuning resistor (one of $R_1$-$R_4$), such that the total resistance is equal to $R=R_{NOM}+R_A$, and eye sampler 128 determines the new signal eye margin. If the signal eye margin has improved over the signal eye margin with ODT network 120 set with the nominal termination resistance value ($R_{NOM}$), then receiver 120 repeats the process of directing ODT controller 128 to set the resistance value to higher resistance values in single steps and determining the new signal eye margin until a maximum signal eye margin is determined (that is, a next higher resistance value results in a poorer signal eye margin), and the resistance value that resulted in the maximum signal eye margin is utilized for the run time operation of the high-speed data communication interface.

If the signal eye margin from the initially increased resistance value did not succeed in improving the signal eye margin, then ODT controller 128 is directed to set the resistance value of ODT network 122 to a single step lower of a resistance value, by switching out one additional tuning resistor (one of $R_1$-$R_4$), such that the total resistance is equal to $R=R_{NOM}-R_A$, and eye sampler 128 determines the new signal eye margin. If the new signal eye margin has improved over the signal eye margin with ODT network 120 set with the nominal termination resistance value ($R_{NOM}$), then receiver 120 repeats the process of directing ODT controller 128 to set the resistance value to lower resistance values in single steps and determining the new signal eye margin until a maximum signal eye margin is determined (that is, a next lower resistance value results in a poorer signal eye margin), and the resistance value that resulted in the maximum signal eye margin is utilized for the run time operation of the high-speed data communication interface.

Figure 2:
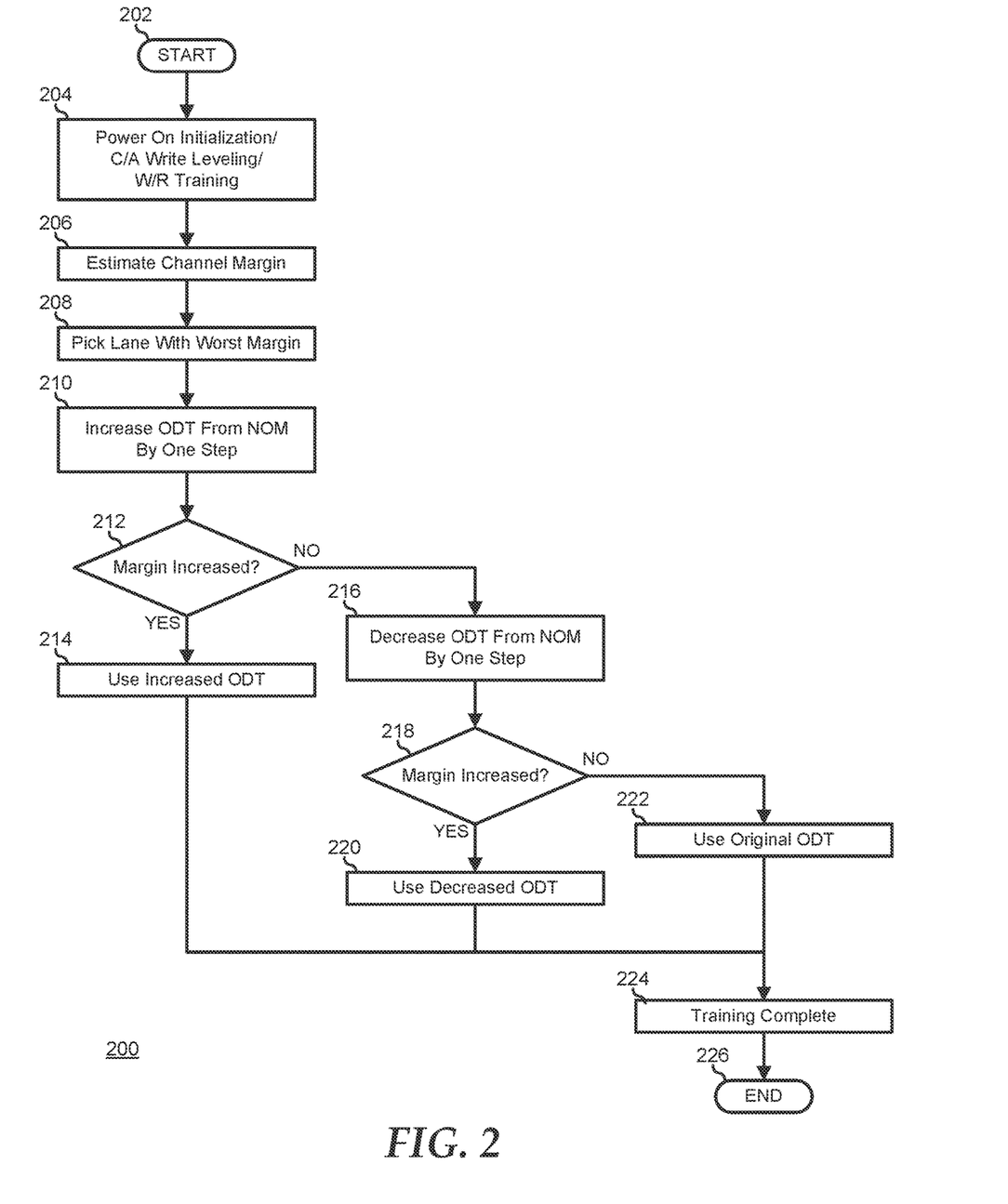
FIG. 2 is a flowchart illustrating a method for optimizing the ODT resistance value of a number of closely coupled high-speed data communication interfaces according to an embodiment of the current disclosure.

FIG. 2 illustrates a method 200 for optimizing the ODT resistance value of a number of closely coupled high-speed data communication interfaces, such as of a command/address bus or data bus of a DDR interface, starting at block 202. A power-on initialization phase of operation on an information handling system is initiated in block 204. The power-on initialization phase will include a selection of a nominal ODT termination resistance value for the group of high-speed data communication interfaces. The power-on initialization phase may include DDR command/address write leveling, read/write training, or the like. In block 206, the signal eye margins for the group of high-speed data communication interfaces are determined, and particular one of the interfaces that is determined to have a worst signal eye margin is selected in block 208. For example, the signal eye margins for the group of high-speed data communication interfaces may be utilized internally within a particular device that includes receivers similar to receiver 100. In another example, the signal eye margins for the group of high-speed data communication interfaces may be communicated to a management controller of an information handling system, similar to management controller 140 of information handling system 100.

The ODT termination resistance value of the selected interface is increased by one step in block 210. A decision is made as to whether or not the signal eye margin has increased in decision block 212. If so, the "YES" branch of decision block 212 is taken, the increased ODT resistance value is utilized for that lane in block 214, the training of the high-speed data communication interfaces is completed in block 224, and the method ends in block 226. The method as described herein may represent a simplified method, and the increasing of the ODT resistance value, as performed in block 210, and the determination as to whether or not the resulting signal eye margin has improved, as determined in decision block 212, may be performed iteratively in order to find a maximized signal eye margin for the selected interface. If the signal eye margin has not increased, the "NO" branch of decision block 212 is taken and the ODT termination resistance value of the selected interface is decreased by one step in block 216.

A decision is made as to whether or not the signal eye margin has increased in decision block 218. If so the "YES" branch of decision block 218 is taken, the decreased ODT resistance value is utilized for that lane in block 220, the training of the high-speed data communication interfaces is completed in block 224, and the method ends in block 226. Again the decreasing of the ODT resistance value, as performed in block 216, and the determination as to whether or not the resulting signal eye margin has improved, as determined in decision block 218, may be performed iteratively in order to find a maximized signal eye margin for the selected interface. If the signal eye margin has not increased, the "NO" branch of decision block 218 is taken and the original ODT termination resistance value for the selected interface is utilized in block 222, the training of the high-speed data communication interfaces is completed in block 224, and the method ends in block 226.

Figure 3:
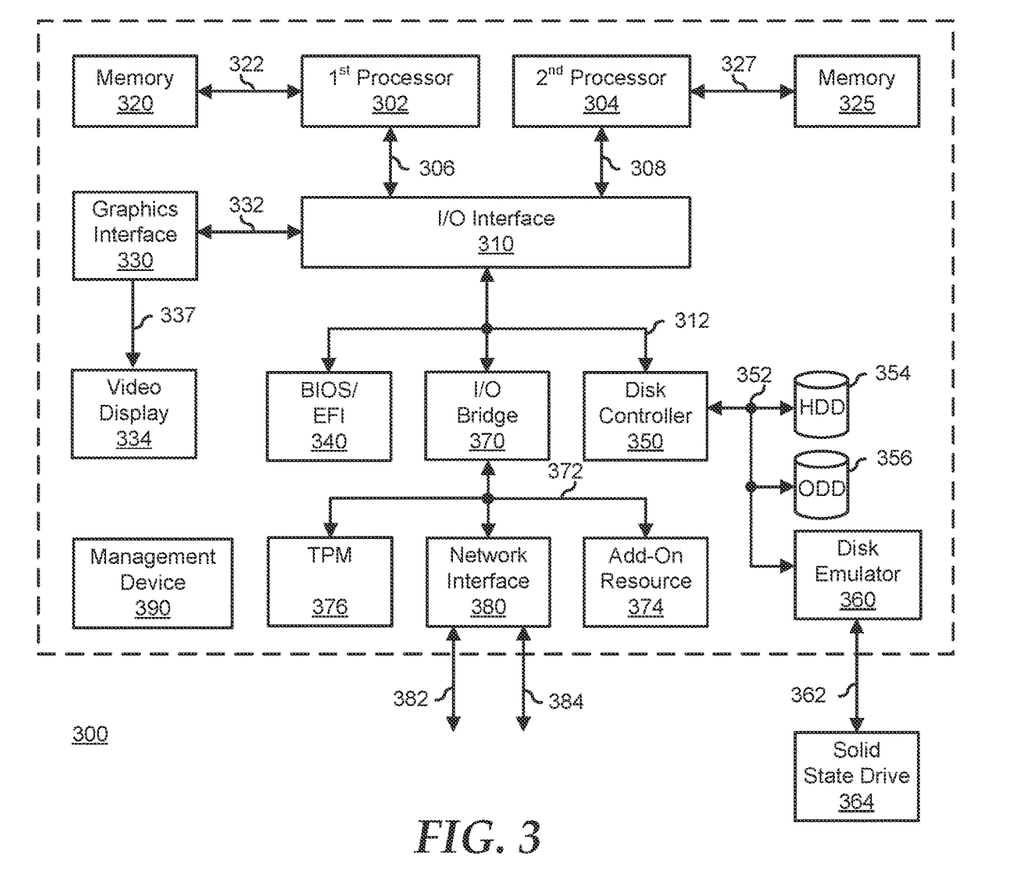
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 2394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver for an information handling system, the receiver comprising:
an on-die termination (ODT) network configured to terminate a data communication interface at one of a plurality of selectable termination impedance values including a particular nominal termination impedance value, at least one higher impedance value, and at least one lower impedance value; and
a signal eye sampler configured to determine a data eye margin for data received on the data communication interface;
wherein the receiver is configured to:
select the nominal impedance value;

determine, by the signal eye sampler, a nominal data eye margin associated with the nominal impedance value;
select a first delta impedance value from one of the higher impedance value and the lower impedance value;
determine, by the signal eye sampler, a first data eye margin associated with the first delta impedance value;
determine whether the first delta data eye margin is greater than the nominal data eye margin; and
set a run time impedance value for the data communication interface to the first delta impedance value when the first delta data eye margin is greater than the nominal data eye margin.

2. The receiver of claim 1, wherein the receiver is further configured to set the run time impedance value to the nominal impedance value when the first delta data eye margin is not greater than the nominal data eye margin.

3. The receiver of claim 1, wherein, prior to setting the run time impedance value to the first delta impedance value, the receiver is further configured to:
select a second delta impedance value, wherein, when the first delta impedance value was a first one of the higher impedance values, the second delta impedance value is a second one of the higher impedance values, and when the first delta impedance value was a first one of the lower impedance values, the second delta impedance value is a second one of the lower impedance values;
determine, by the signal eye sampler, a second data eye margin associated with the second delta impedance value;
determine whether the second delta data eye margin is greater than the first delta data eye margin; and
set the run time impedance value to the second delta impedance value when the second delta data eye margin is greater than the first delta data eye margin.

4. The receiver of claim 1, wherein, when the first delta data eye margin is not greater than the nominal data eye margin, the receiver is further configured to:
select a second delta impedance value, wherein, when the first delta impedance value was one of the higher impedance values, the second delta impedance value is the lower impedance value, and when the first delta impedance value was one of the lower impedance values, the second delta impedance value is the higher impedance value;
determine, by the signal eye sampler, a second data eye margin associated with the second delta impedance value;
determine whether the second delta data eye margin is greater than the nominal data eye margin; and
set the run time impedance value to the second delta impedance value when the second delta data eye margin is greater than the nominal data eye margin.

5. The receiver of claim 4, wherein the receiver is further configured to set the run time impedance value to the nominal impedance value when the second delta data eye margin is not greater than the nominal data eye margin.

6. The receiver of claim 1, wherein the receiver selects the nominal impedance value, determines the nominal data eye margin, selects the first delta impedance value, determines the first data eye margin, determines whether the first delta data eye margin is greater than the nominal data eye margin, and sets the run time impedance value for the data communication interface during a power-on initialization phase of operation of the information handling system.

7. The receiver of claim 1, further comprising:
an ODT controller configured to select the terminal impedance value.

8. The receiver of claim 1, wherein the receiver is included in a dual in-line memory module (DIMM).

9. The receiver of claim 8, wherein the DIMM is a fifth generation double data rate (DDR5) DIMM.

10. A method, comprising:
providing, on a receiver of an information handling system, an on-die termination (ODT) network configured to terminate a data communication interface at one of a plurality of selectable termination impedance values including a particular nominal termination impedance value, at least one higher impedance value, and at least one lower impedance value;
providing, on the receiver, a signal eye sampler configured to determine a data eye margin for data received on the data communication interface;
selecting the nominal impedance value;
determining, by the signal eye sampler, a nominal data eye margin associated with the nominal impedance value;
selecting a first delta impedance value from one of the higher impedance value and the lower impedance value;
determining, by the signal eye sampler, a first data eye margin associated with the first delta impedance value;
determining whether the first delta data eye margin is greater than the nominal data eye margin; and
setting a run time impedance value for the data communication interface to the first delta impedance value when the first delta data eye margin is greater than the nominal data eye margin.

11. The method of claim 10, further comprising setting the run time impedance value to the nominal impedance value when the first delta data eye margin is not greater than the nominal data eye margin.

12. The method of claim 10 wherein, prior to setting the run time impedance value to the first delta impedance value, the method further comprises:
selecting a second delta impedance value, wherein, when the first delta impedance value was a first one of the higher impedance values, the second delta impedance value is a second one of the higher impedance values, and when the first delta impedance value was a first one of the lower impedance values, the second delta impedance value is a second one of the lower impedance values;
determining, by the signal eye sampler, a second data eye margin associated with the second delta impedance value;
determining whether the second delta data eye margin is greater than the first delta data eye margin; and
setting the run time impedance value to the second delta impedance value when the second delta data eye margin is greater than the first delta data eye margin.

13. The method of claim 10, wherein, when the first delta data eye margin is not greater than the nominal data eye margin, the method further comprises:
selecting a second delta impedance value, wherein, when the first delta impedance value was one of the higher impedance values, the second delta impedance value is the lower impedance value, and when the first delta impedance value was one of the lower impedance values, the second delta impedance value is the higher impedance value;

determining, by the signal eye sampler, a second data eye margin associated with the second delta impedance value;

determining whether the second delta data eye margin is greater than the nominal data eye margin; and setting the run time impedance value to the second delta impedance value when the second delta data eye margin is greater than the nominal data eye margin.

14. The method of claim 13, further comprising setting the run time impedance value to the nominal impedance value when the second delta data eye margin is not greater than the nominal data eye margin.

15. The method of claim 10, wherein selecting the nominal impedance value, determining the nominal data eye margin, selecting the first delta impedance value, determining the first data eye margin, determining whether the first delta data eye margin is greater than the nominal data eye margin, and setting the run time impedance value for the data communication interface are provided during a power-on initialization phase of operation of the information handling system.

16. The method of claim 10, further comprising providing an ODT controller configured to select the terminal impedance value.

17. The method of claim 10, wherein the receiver is included in a dual in-line memory module (DIMM).

18. The method of claim 17, wherein the DIMM is a fifth generation double data rate (DDR5) DIMM.

19. An information handling system, comprising:
a transmitter of a data communication interface; and
a receiver of the data communication interface, the receiver including:
an on-die termination (ODT) network configured to terminate the data communication interface at one of a plurality of selectable termination impedance values including a particular nominal termination impedance value, at least one higher impedance value, and at least one lower impedance value; and
a signal eye sampler configured to determine a data eye margin for data received on the data communication interface;
wherein the receiver is configured to:
select the nominal impedance value;
determine, by the signal eye sampler, a nominal data eye margin associated with the nominal impedance value;
select a first delta impedance value from one of the higher impedance value and the lower impedance value;
determine, by the signal eye sampler, a first data eye margin associated with the first delta impedance value;
determine whether the first delta data eye margin is greater than the nominal data eye margin; and
set a run time impedance value for the data communication interface to the first delta impedance value when the first delta data eye margin is greater than the nominal data eye margin.

20. The information handling system of claim 19, wherein the receiver is further configured to set the run time impedance value to the nominal impedance value when the first delta data eye margin is not greater than the nominal data eye margin.

* * * * *